Feb. 4, 1969

D. DEWAR 3,425,524

BRAKE DISC STRUCTURE

Filed July 5, 1966

3,425,524
BRAKE DISC STRUCTURE
Douglas Dewar, Wolston, near Coventry, England, assignor to The Dunlop Company Limited
Filed July 5, 1966, Ser. No. 562,550
Claims priority, application Great Britain, July 14, 1965, 29,764/65
U.S. Cl. 188—218                 14 Claims
Int. Cl. F16d 65/12, 65/84, 13/72

ABSTRACT OF THE DISCLOSURE

This invention is directed to a brake stator constituted by a metal shell having an internal core of high specific heat material such as beryllium, the braking surfaces being provided by the shell and the braking heat being absorbed by the core material which is adapted to be a thermal reservoir and is of lightweight properties.

---

This invention relates to disc brakes, and particularly to friction members for disc brakes.

Disc brakes for aircraft normally comprise two interleaved sets of annular friction members, a set of stator members keyed to a fixed axle and a set of rotor members drivably keyed to a wheel which is rotatably mounted on the axle. The rotor members are normally of steel and the stator members are provided with segmental pads of friction material which engage the side surfaces of the rotor members on application of the brake.

The steel rotor members are very heavy; this is necessary in order to provide a sufficiently high thermal capacity to absorb the large quantities of heat generated when the brake is operated to bring an aircraft to rest, without excessive increase of temperature in the brake.

The object of the present invention is to provide an aircraft brake of reduced weight.

According to one aspect of the invention a friction member for a brake comprises a container of steel or similar material formed from two annular side members and having an annular core sandwiched between the side members, the core being formed from or containing beryllium.

According to another aspect of the invention a friction member for a brake comprises a pair of annular shells formed from steel or similar material and an annular core formed from or containing beryllium, the shells being detachably secured together one on each side of the core.

In a preferred construction, the friction member in accordance with the invention constitutes a rotor member of an aircraft brake.

The expression "steel or similar material" as used in this specification and in the claims means materials which exhibit high durability and low distortion when subjected to the thermal and mechanical stresses encountered during braking. Such materials include, steel, particularly air-hardened high-tensile steel, copper and iron.

The annular core of a friction member according to the invention may be in the form of a continuous annulus, or may be assembled from at least two, and preferably eight segments.

Figure 1:
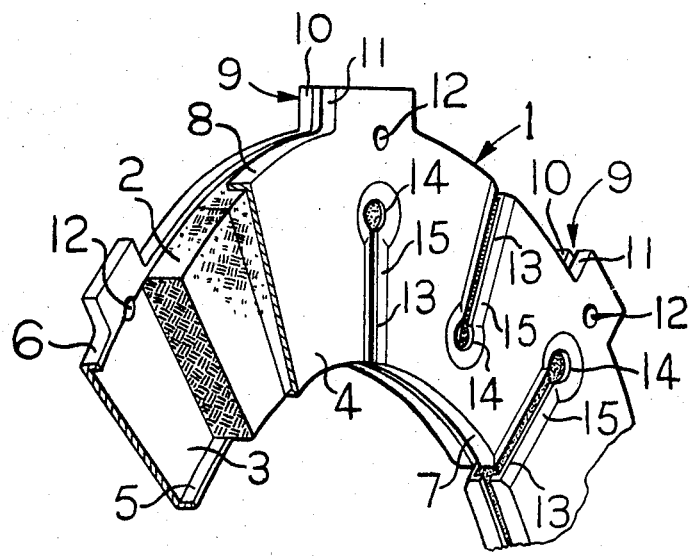
Figure 2:
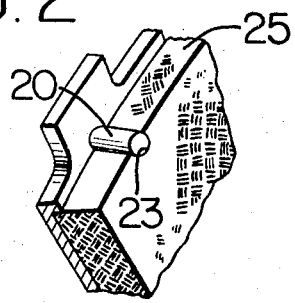

One embodiment of the invention will now be described by way of example, with reference to the accompanying drawings, wherein:

FIGURE 1 is a sectional perspective view of a friction member according to the invention, wherein one of the annular side members is broken away to illustrate the internal core material, and also show the inner surface of the other annular member; and FIGURE 2 is an isometric detail view showing one of the shell members and rivet member used for fastening the two shell sections together, and one of the internal core segments.

An aircraft brake of conventional construction comprises interleaved annular sets of rotor and stator members. The stator members are of conventional construction, having pads of friction material secured to their side faces for engagement with the corresponding surfaces of the rotor members and being axially slidably, but nonrotatably, mounted on a fixed axle.

The rotor members are of conventional shape, having drive lugs formed on their outer peripheries for engagement with corresponding keyways formed on the inner periphery of an associated wheel. In the embodiment of the invention shown in the drawing, each rotor member 1, forming a friction member for the brake, comprises an annular core 2 assembled from eight annular segments made from beryllium, the beryllium segments being enclosed by a container in the form of a pair of annular steel shells 3, 4 which form the side members of the rotor. Each steel shell 3, 4 is provided with axially extending flanges 5, 6 and 7, 8 respectively at its inner and outer peripheries to fit around the beryllium core, the edges of the inner and outer peripheral flanges of one shell lying adjacent the edges of the corresponding flanges of the outer shell in the assembled state of the rotor.

The drive lugs 9 each comprise two radially extending and axially aligned portions 10, 11 one on the outer circumferential surface of each of the steel shells 3, 4 respectively, and axially extending holes 12 are formed in the shells adjacent each drive lug to enable the shells to be detachably secured together by rivets (not shown). The shells are each provided with slots 13 extending partly across their radially extending faces, each of the slots on one of the two shells being axially aligned with a slot on the other shell, each pair of aligned slots terminating in a pair of circular axially-aligned apertures 14 one in each shell and each slot having a continuous bevelled axially outer edge 15. The slots 13 run alternately from the inner periphery and the outer periphery of each shell in succession around the shell to prevent cracking of the shell as distortion occurs under heat and pressure generated during braking.

In the arrangement descibed above adjacent beryllium segments are spaced apart circumferentially so that their adjacent edges are separated by narrow gaps, thus forming a substantially continuous annular core, and may be provided with means such as for example rivets (FIGURE 2) to prevent circumferential movement relative to the annular shells comprising a formation such as a notch 23 in the outer periphery 25 of each segment, the formation being engageable with at least one of the rivets 20 holding the outer shells together. Alternatively the beryllium core 2 may be secured to the shells 3, 4 by brazing or casting, to improve the heat transfer properties of the interfaces between the shells and the core but it is not essential to perform such brazing or casting in order to realize the major benefits of this invention.

Since beryllium has a high specific heat and low density, it has been calculated that by replacing a steel rotor with a composite rotor as described above, a weight saving of the order of 50–60 percent can be achieved.

One serious disadvantage of beryllium is that it is toxic, and it must, therefore, not be subjected to abrasion in service since the dust produced could be dangerous to maintenance personnel. Further, beryllium does not have sufficient inherent strength to withstand the arduous conditions of service of an aircraft brake friction member.

The above disadvantages, which would appear to rule out the possibility of using beryllium in an aircraft brake, are overcome by the construction in accordance with the invention, since the beryllium core is mechanically supported by its total enclosure within the steel shells and it is not subjected to abrasion since the frictional engagement between the rotor and stator members is taken on the surface of the steel shells.

Although the present invention has been illustrated and described in connection with a selected example embodiment of the invention, it will be understood that this is illustrative of the invention and is by no means restrictive thereof. It is reasonably to be anticipated that those skilled in the art can make numerous revisions and adaptations of the invention.

Having now described my invention, what I claim is:

1. In a disc brake or the like, a friction member comprising an annular core constructed from a high specific heat material in the form of beryllium, and an annular torque receiving container for said core constituted by a pair of shells of metallic material having a high durability and low distortion under thermal and mechanical stresses produced during braking, said shells having means for releasably securing them together one on each side of said core to form an enclosure for said core and having an intimate contact with said core under the high axial pressures exterted between the internal core and confronting surfaces of said shells during a brake application.

2. A friction member in accordance with claim 1 wherein said core material is constituted by not less than two segments which together form an annular configuration substantially filling the core defined by said annular container.

3. A friction member in accordance with claim 2 wherein said segments are provided with adjacent edges which are separable to form narrow gaps therebetween.

4. A friction member in accordance with claim 1 wherein said pair of annular shells are formed from steel.

5. A friction member in accordance with claim 4 wherein said means for detachably securing the shells together are provided in the form of rivets or the like.

6. A friction member in accordance with claim 4 including means forming a locking connection between said securing means for securing the shells together and the annular core to prevent relative circumferential movement therebetween.

7. A friction member in accordance with claim 4 which constitutes a rotor member of an aircraft brake.

8. An aircraft brake comprising a friction member in accordance with claim 4.

9. A friction member in accordance with claim 4 wherein said shells each include coacting axially extending flanges at the inner and outer peripheries respectively to surround said beryllium core.

10. A friction member in accordance with claim 9 wherein the respective edges along the inner and outer peripheral sections of said cores are dimensioned to substantially cover the corresponding inner and outer peripheral sections of the core material.

11. A friction member in accordance with claim 4 including a plurality of circumferentially spaced drive lugs formed integrally on the outer periphery of said shells.

12. A friction member in accordance with claim 11 wherein each drive lug comprises two complementary radially extending and axially aligned portions on said shells, one on the outer circumferential surface at each of said shells.

13. A friction member in accordance with claim 4 wherein the radially extending faces of said annular shells have slots formed therein extending partly across the said radially extending faces.

14. A friction member in accordance with claim 13 wherein each of said slots is formed in axially aligned relation one in each shell and having a continuous bevelled axially outer edge.

References Cited

UNITED STATES PATENTS

| 2,554,874 | 5/1951 | Oetzel | 188—264 X |
| 2,850,118 | 9/1958 | Byers | 188—218 X |
| 3,105,575 | 10/1963 | Dewar et al. | 188—218 |
| 3,208,559 | 9/1965 | Chambers et al. | 188—264 |
| 3,306,401 | 2/1967 | Dasse | 188—251 |

FOREIGN PATENTS

| 1,225,964 | 2/1960 | France. |
| 790,100 | 2/1958 | Great Britain. |

GEORGE E. A. HALVOSA, *Primary Examiner.*

U.S. Cl. X.R.

188—264; 192—107, 113; 244—100